(12) United States Patent
Lampe et al.

(10) Patent No.: US 9,767,607 B1
(45) Date of Patent: Sep. 19, 2017

(54) CORRELATION OF VIDEO INPUTS IN A DIGITAL VIDEO RECORDER SYSTEM

(75) Inventors: Charles Gregory Lampe, Silver Spring, MD (US); James Craig Moran, Annapolis, MD (US)

(73) Assignee: Verint Americas Inc., Melville, NY (US)

( * ) Notice: Subject to any disclaimer, the term of this patent is extended or adjusted under 35 U.S.C. 154(b) by 1318 days.

(21) Appl. No.: 13/316,834

(22) Filed: Dec. 12, 2011

(51) Int. Cl.
*H04N 5/77* (2006.01)
*G06T 19/00* (2011.01)
*H04N 5/232* (2006.01)
*G01S 19/42* (2010.01)

(52) U.S. Cl.
CPC ....... *G06T 19/006* (2013.01); *H04N 5/23293* (2013.01); *G01S 19/42* (2013.01)

(58) Field of Classification Search
USPC .................................................. 386/223, 248
See application file for complete search history.

(56) References Cited

U.S. PATENT DOCUMENTS

| 5,822,542 A * | 10/1998 | Smith et al. ................... 709/247 |
| 2003/0097532 A1* | 5/2003 | Montgomery ................ 711/154 |
| 2008/0123915 A1* | 5/2008 | Nagy ............................ 382/128 |
| 2008/0303903 A1* | 12/2008 | Bentley et al. ............... 348/143 |
| 2010/0189368 A1* | 7/2010 | Des Jardins et al. ......... 382/218 |

* cited by examiner

*Primary Examiner* — Nigar Chowdhury
(74) *Attorney, Agent, or Firm* — Meunier Carlin & Curfman LLC

(57) ABSTRACT

Systems, methods, and software for operating video systems are provided herein. In one example, a video system is provided. The video system includes a digital video recorder and a translation unit. The digital video recorder comprises a camera interface configured to receive video captured from a first plurality of camera and a storage system configured to store the video captured by the first plurality of cameras. The translation unit comprises a processing system configured to translate video stored in a first configuration on a first digital video recorder storage system for storage in a second configuration on a second digital video recorder storage system.

18 Claims, 2 Drawing Sheets

CORRELATION OF VIDEO INPUTS IN A DIGITAL VIDEO RECORDER SYSTEM

TECHNICAL FIELD

Aspects of the disclosure are related to the field of video systems, and in particular, video recording and digital video recording devices.

TECHNICAL BACKGROUND

Video surveillance and display systems typically include video capture devices, such as video cameras, linked to centralized equipment, such as digital video recorders, servers, storage systems, video multiplexers, video processing equipment, or other equipment. The video capture devices could be situated in a location distant from the centralized equipment and be configured to transfer video over various links for collection, viewing, manipulation, and storage by the centralized equipment. After storage, the video of the video capture devices can be viewed on a display device, such as video monitor or video display system. However, when video data is stored in a digital video system, such as a video storage system, upgrading to new systems and storage devices can be difficult. This can be especially difficult when the number and configuration of video capture devices and associated video data are also changed and are not necessarily compatible with a configuration of new video capture devices.

OVERVIEW

Systems, methods, and software for operating video systems are provided herein. In a first example, a video system is provided. The video system includes a digital video recorder and a translation unit. The digital video recorder comprises a camera interface configured to receive video captured from a first plurality of camera and a storage system configured to store the video captured by the first plurality of cameras. The translation unit comprises a processing system configured to translate video stored in a first configuration on a first digital video recorder storage system for storage in a second configuration on a second digital video recorder storage system.

In a second example, a method of operating a video system is provided. The method includes receiving video captured from a plurality of cameras, and storing the video captured by the plurality of cameras in a storage system. The method also includes receiving archive video stored in a first configuration on an archive storage system, where the archive video comprises video previously captured from at least a first one of the plurality of cameras, determining a second configuration for the archive video, and transferring the archive video of the first one of the plurality of cameras for storage on the storage system in the second configuration.

In a third example, a computer-readable medium having program instructions stored thereon for operating a video system is also disclosed. When executed by the video system, the program instructions direct the video system to receive video captured from a plurality of cameras, and store the video captured by the plurality of cameras in a storage system. When executed by the video system, the program instructions also direct the video system to receive archive video stored in a first configuration on an archive storage system, where the archive video comprises video previously captured from at least a first one of the plurality of cameras, determine a second configuration for the archive video, and transfer the archive video of the first one of the plurality of cameras for storage on the storage system in the second configuration.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
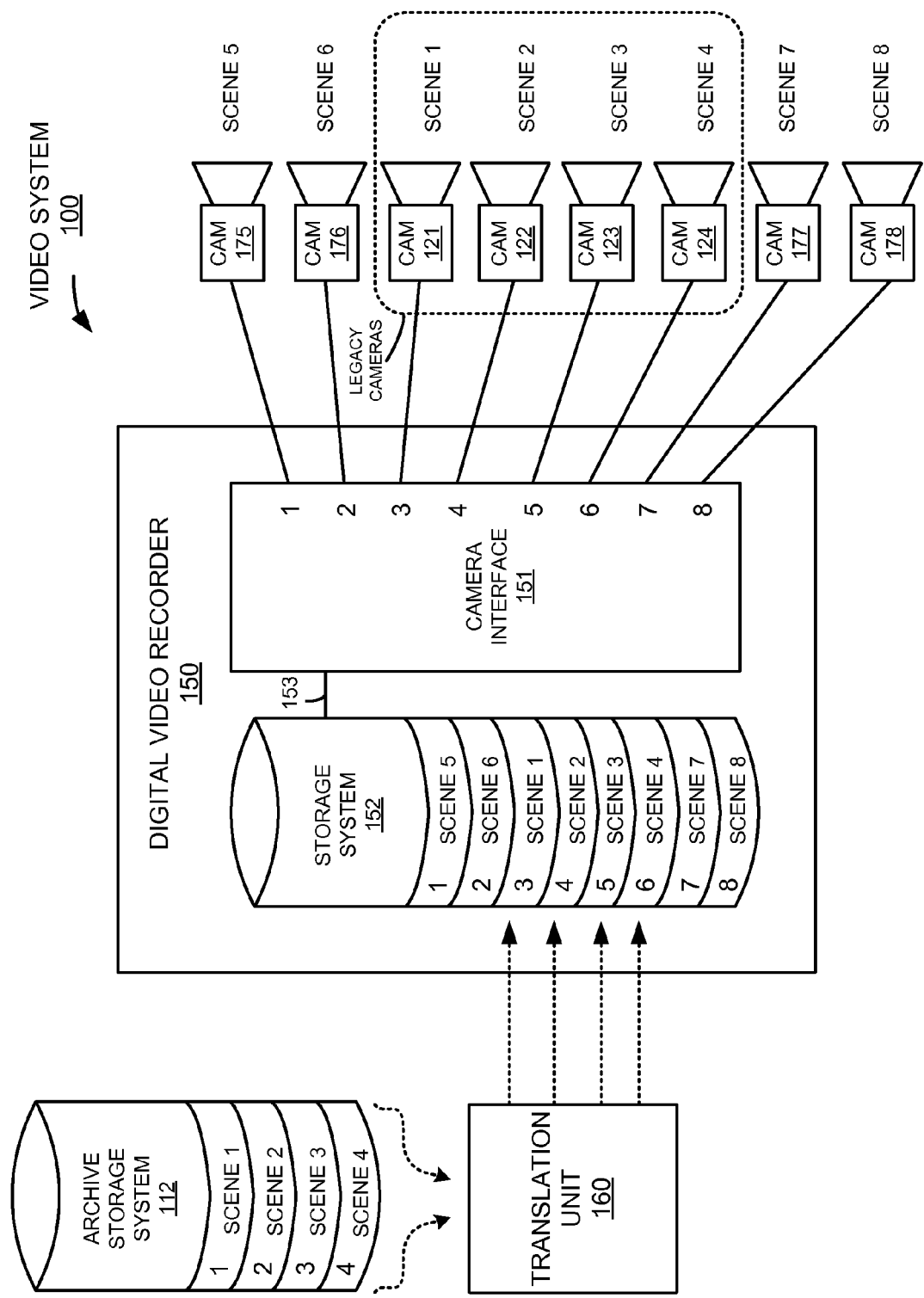
FIG. 1 is a system diagram illustrating a video system.

FIG. 1 shows an example video system, video system 100. Video system 100 includes digital video recorder (DVR) 150, cameras (CAM) 121-124, cameras 175-178, translation unit 160, and archive storage system 112. DVR 150 includes camera interface 151 and storage system 152. Camera interface 151 and storage system 152 communicate over link 153. DVR 150 and each of cameras 121-124 and 175-178 communicate through ports 1-8 of camera interface 151. It should be understood that DVR 150 could include translation unit 160 or archive storage system 112 in further examples.

Camera interface 151 includes circuitry and equipment to receive and process video from a plurality of video cameras received at ports 1-8. Camera interface 151 could comprise transceivers, amplifiers, impedance matching circuitry, connectors, analog-to-digital converters, video processors, buffers, video compression processors, video encoding processors, or other circuitry and equipment. In some examples, camera interface 151 receives analog video from cameras in an analog format, such as NTSC, PAL, or other analog video format. In examples where analog video is received from cameras, camera interface 151 could encode the analog video into a digital format. In further examples, camera interface 151 could compress or encrypt the video into a digital format. In other examples, camera interface 151 receives digital video from cameras in a digital format, such as MPEG, H.264, JPEG video, a packet format, or other digital video format.

Storage system 152 includes a computer-readable storage medium to store video received from camera interface 151 or from translation unit 160. Storage system 152 could comprise a computer-readable medium such as a disk, tape, integrated circuit, server, or some other memory device, and also may be distributed among multiple memory devices. In some examples, storage system 152 receives digital or packet video from camera interface 151. In further examples, storage system 152 receives analog video from camera interface 151, and storage system 152 digitizes the analog video received from camera interface 151. In other examples, storage system 152 changes the video format or other video properties of the video received from camera interface 151 for storing the video on the storage medium.

The camera links associated with ports 1-8 of camera interface 151 each use metal, glass, optical, air, space, or some other material as the transport media. The camera links could each use various analog or digital video formats, such as NTSC, PAL, MPEG, H.264, JPEG video, or some other video format, including combinations, improvements, or variations thereof. The camera links could be a direct link or might include various equipment, intermediate components, systems, and networks.

Link 153 comprises a physical, logical, or virtual communication link, capable of communicating video, video packets, data, control signals, and communications, along with other information. In some examples, link 153 may be a software or logical link. In other examples, link 153 uses various communication media, such as air, space, metal, optical fiber, or some other signal propagation path, including combinations thereof. Link 153 could be a direct link or might include various equipment, intermediate components, systems, and networks.

The camera links or link 153 may each include many different signals sharing the same link—as represented by the associated lines in FIG. 1—comprising channels, forward links, reverse links, user communications, communication sessions, frequencies, carriers, timeslots, transportation ports, logical transportation links, network sockets, packets, or communication directions. The camera links or link 153 could each be direct links or may include intermediate networks, systems, or devices.

DVR 150 and translation unit 160 also each include a processing system which retrieves and executes software from computer-readable media. In further examples, the associated processing systems each comprise specialized circuitry, and any software or computer-readable medium could be included in the specialized circuitry to operate the processing systems. The associated computer-readable medium could include a disk, tape, integrated circuit, server, or some other memory device, and also may be distributed among multiple memory devices. The associated software may include an operating system, logs, utilities, drivers, networking software, video processing software, and other software typically loaded onto a computer system. The associated software could contain an application program, firmware, or some other form of computer-readable processing instructions. When executed by the associated processing system, the software directs the processing system to operate as described herein.

In some examples, DVR 150 includes multiple drive bays. The drive bays could be configured to hold various computer-readable storage media. For example, DVR 150 could include two hard drive bays. The drive bays could be internal to an enclosure of DVR 150, or could provide external access to the drive bays, such as for hot-swapping media. In further examples, DVR 150 includes storage system 152 in a first drive bay and includes an auxiliary or spare drive bay for adding an additional storage system, such as archive storage system 112. In yet further examples, the auxiliary drive bay could include a backup storage system for backing up the data stored on storage system 152.

In FIG. 1, eight cameras are coupled to camera interface 151, although a different number of cameras could be employed. Each of cameras 121-124 and 175-178 are individually coupled to one of ports 1-8 of camera interface 151. In the example shown in FIG. 1, cameras 121-124 are legacy cameras, and cameras 175-178 are new cameras, although other configurations could be employed. Each camera also is associated with a scene, as indicated by the scene numbers 1-8. Scenes 1-8 could include the view the associated camera captures, such as a parking lot, office space, cashier station, or other scene.

In this example, legacy cameras 121-124 were installed prior to new cameras 175-178. Legacy cameras 121-124 are associated with scenes 1-4 as indicated in FIG. 1. Legacy cameras 121-124 could have been operated with a legacy digital video recorder or other video system, and associated video data stored on archive storage system 112. DVR 150 could have been added to increase the number of camera ports in video system 100, such as for increasing a number of camera ports for new cameras 175-178. The configuration of the camera ports 1-8 on DVR 150 and the legacy DVR system could be different, and thus the storage locations for each scene stored on storage system 152 could be different from the storage locations for each scene stored on a legacy DVR system.

In FIG. 1, archive storage system 112 is a computer-readable medium storing archive video data for legacy cameras 121-124. Storage system 112 includes four storage locations, 1-4, with video data for an associated one of scenes 1-4 stored thereon. Archive storage system 112 could be associated with a legacy DVR system, a legacy hard disk drive, or other storage system, such as a disk, tape, integrated circuit, server, or some other memory device, and also may be distributed among multiple memory devices. The individual storage locations could each include file folders, composite files, partitions, disk drives, disk arrays, flash memory media, optical discs, or other storage demarcations or computer-readable media.

Translation unit 160 includes a processing system to read the video data stored on storage system 112 in each of storage locations 1-4, determine the scene associated with each of storage locations 1-4, translate the video data for storage on storage system 152, and transfer the video data for storage on storage system 152. In this example, in archive storage system 112, storage location 1 is associated with scene 1, storage location 2 is associated with scene 2, storage location 3 is associated with scene 3, and storage location 4 is associated with scene 4. Different storage locations are associated with different scenes for storage system 152, as indicated in FIG. 1. Ports 1-8 on camera interface 151 are associated with individual ones of storage locations 1-8 on storage system 152, such as video data for cameras 121-124 is received on ports 3-6 of camera interface 151 and stored in storage locations 3-6. It should be noted that different storage locations are associated with cameras 121-124 on archive storage system 112 than are associated with cameras 121-124 and 175-178 on storage system 152.

Translation unit 160 determines the scenes associated with each of storage locations 1-8 on storage system 152, and for each of storage locations 1-4 of storage system 112. Translation unit 160 correlates scenes associated with storage locations 1-4 of storage system 112 to scenes associated with storage locations of storage system 152. In some examples, a scene identifier is associated with each of storage locations 1-8 of storage system 152 and the scene identifiers could be received from DVR 150. Likewise, a scene identifier could be associated with each of storage locations 1-4 of storage system 112 and the scene identifiers could be received from storage system 112. In other examples, translation unit 160 generates scene identifiers. In further examples, the video data of each storage location is processed to determine individual video scenes. The individual video scenes could be related to the video scenes captured by each associated camera, such as determining a video signature for the video data stored for each scene. For example, a video scene could include a parking lot, and a video signature could be determined based on the video data captured by the video camera facing the parking lot. Different scenes could correspond to different video signatures by analyzing the video data. In yet further examples, frames of the video data could be compared between frames stored on storage system 112, frames stored on storage system 152, or live frames captured by cameras 121-124 and 175-178 to determine video data that correlates a scene to a camera or storage location. In even further examples, a user could identify the cameras associated with the scenes and storage locations associated with archive storage system 112 or storage system 152. A graphical user interface could be provided by DVR 150 or translation unit 160 for the user to select associations between cameras, scenes, and storage locations.

Translation unit 160 determines a first configuration of the video data for each scene stored on archive storage system 112 and a second configuration of the video data for each scene stored on storage system 152. The first and second configuration could each include the scene numbering information or identifiers correlating the scenes to the storage locations, among other correlation information. The first and second configuration could each include a video format for the video data, such as a compression format, bit rate, frame rate, resolution, frame size, audio format, file naming convention, file sizing, video data container, packet format, encryption format, or other configuration information for the video data for each scene.

Translation unit 160 translates the video data stored on archive storage system 112 in the first configuration into video data in the second configuration for transfer to storage system 152. Translation unit 160 transfers the video data in the second configuration for storage on storage system 152. Storage on storage system 152 could include copying the video data from storage system 112 for a particular scene into the storage location associated with the same scene on storage system 152, after translation from the first configuration to the second configuration. Storage on storage system 152 could include linking the video data from storage system 112 for a particular scene with the storage location associated with the same scene on storage system 152, after translation from the first configuration to the second configuration. In further examples, translation unit 160 receives requests for archive video data stored on archive storage system 112 and translates in real-time the archive video data from a first configuration into a second configuration for storage or access by DVR 150.

After the transfer of the archive video data from archive storage system 112 to storage system 152, archive video data for cameras 121-124 could be stored in the associated storage location 3-6 associated with scene 1-4 on storage system 152. DVR 150 could then access the archive video data for cameras 121-124 as well as new video data captured by cameras 121-124 by accessing the video data on storage system 152. Storage system 112 could be discarded, disabled, or put into long-term storage after transfer of the video data to storage system 152. In many examples, during processing and transfer of the video data from archive storage system 112 to storage system 152, DVR 150 continues to monitor cameras 121-124 and 175-178 and store the captured video in storage system 152. In further examples, storage system 152 could communicate with a backup storage system. Data stored on storage system 152 could be backed up to the backup storage system during normal operation during capture of video from cameras 121-124 and 175-178.

Figure 2:
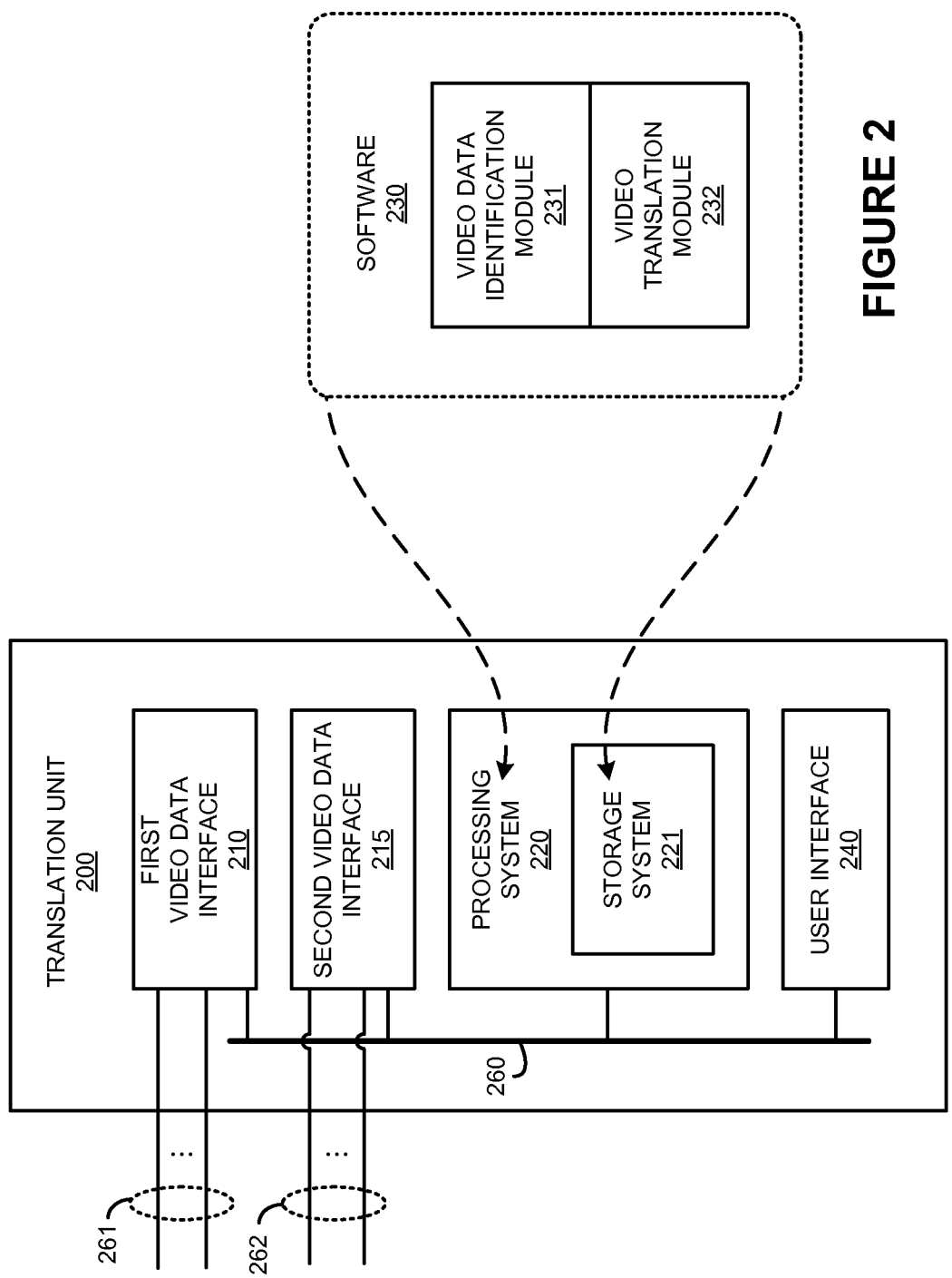
FIG. 2 is a block diagram illustrating a translation unit.

FIG. 2 is a block diagram illustrating translation unit 200, as an example of translation unit 160 found in FIG. 1, although translation unit 160 could use other configurations. Translation unit 200 includes first video data interface 210, second video data interface 215, processing system 220, and user interface 240. First video data interface 210, second video data interface 215, processing system 220, and user interface 240 are shown to communicate over a common bus 260 for illustrative purposes. It should be understood that discrete links could be employed, such as data links, video links, or other links. Translation unit 200 may be distributed or consolidated among equipment or circuitry that together forms the elements of translation unit 200.

First video data interface 210 and second video data interface 215 each include circuitry and equipment to receive and video of a plurality of video capture devices over associated links 261 and 262. First video data interface 210 and second video data interface 215 each could comprise network interfaces, transceivers, amplifiers, impedance matching circuitry, connectors, analog-to-digital converters, digital-to-analog converters, video processors, buffers, video compression processors, video encoding processors, or other circuitry and equipment. In typical examples, first video data interface 210 and second video data interface 215 each receives digital video from cameras in a digital format, such as MPEG, H.264, Flash, VP8, or JPEG video, and could include various packet formats such as IP packets or Ethernet, or other digital video and packet formats. First video data interface 210 and second video data interface 215 each could encode, transcode, compress, or encrypt the video into a digital format, or change a digital format of the video to a different format. In further examples, first video data interface 210 receives analog video from cameras in an analog format, such as NTSC, PAL, or other analog video format, and encodes the analog video into a digital format. In some examples, portions of functionality mentioned above for first video data interface 210 or second video data interface 215 each are handled in processing system 220. Links 261-262 could each use various protocols or communication formats as described herein for links camera links associated with ports 1-8 of camera interface 151 or link 153, could include Ethernet, Internet protocol (IP), video, digital, packet, or other links and protocols, including combinations, variations, or improvements thereof.

Processing system 220 includes storage system 221. Processing system 220 retrieves and executes software 230 from storage system 221. In some examples, processing system 220 is located within the same equipment in which first video data interface 210, second video data interface 215, user interface 240 are located. In further examples, processing system 220 comprises specialized circuitry, and software 230 or storage system 221 could be included in the specialized circuitry to operate processing system 220 as described herein. Storage system 221 could include a non-transitory computer-readable medium such as a disk, tape, integrated circuit, server, flash memory, phase change memory, magnetic memory, optical memory, or some other memory device, and also may be distributed among multiple memory devices.

Software 230 may include an operating system, logs, utilities, drivers, networking software, tables, databases, data structures, and other software typically loaded onto a computer system. Software 230 could contain application programs, server software, firmware, or some other form of computer-readable processing instructions. When executed by processing system 220, software 230 directs processing system 220 to operate as described herein.

In this example, software 230 includes video data identification module 231 and video translation module 232. It should be understood that a different configuration could be employed, and individual modules of software 230 could be included in different equipment in translation unit 200. Video data identification module 231 receives archive video stored in a first configuration on an archive storage system, and identifies a configuration of the video stored in the first configuration. Video translation module 232 determines a second configuration for the archive video, and transfers the archive video for storage on the storage system in the second configuration. The storage system could include storage system 221 or could include other video storage devices as discussed herein.

User interface 240 includes equipment and circuitry for receiving user input and control, such as for reviewing video, initiating video translation or conversion processes, or entering information regarding video capture devices, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 240 also includes equipment to communicate information to a user of translation unit 200. Examples of the equipment to communicate information or video to the user could include displays, indicator lights, lamps, light-emitting diodes, haptic feedback devices, audible signal transducers, speakers, buzzers, alarms, vibration devices, or other indicator equipment, including combinations thereof.

Bus 260 comprises a physical, logical, or virtual communication link, capable of communicating data, control signals, and communications, along with other information. In this example, bus 260 also includes RF and power distribution elements, such as wires, circuit board traces, or other elements. In some examples, bus 260 is encapsulated within the elements of first video data interface 210, second video data interface 215, processing system 220, or user interface 240, and may be a software or logical link. In other examples, bus 260 uses various communication media, such as air, space, metal, optical fiber, or some other signal propagation path, including combinations thereof. Bus 260 could be a direct link or might include various equipment, intermediate components, systems, and networks.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A video system, comprising:
    a digital video recorder comprising:
        a camera interface configured to receive video captured from a plurality of cameras, and
        a storage system configured to store the received video, wherein the video captured from each of the plurality of cameras was captured in a respective configuration format and stored in the storage system in the same respective configuration format; and
    a translation unit coupled to the digital video recorder and coupled to an archive storage system, wherein the archive storage system is separate from the storage system, the translation unit is configured to:
        receive archive video stored in a first configuration format on the archive storage system, wherein the archive video comprises video previously captured from at least a first one of the plurality of cameras and captured in the first configuration format,
        identify video captured from at least a second one of the plurality of cameras in a second configuration format and stored by the storage system in the second configuration format,
        translate the configuration of the archive video from the first configuration to the second configuration, and
        transfer the translated archive video to the storage system.

2. The video system of claim 1, wherein the first configuration comprises a first correlation of the video previously captured from the first one of the plurality of cameras to a storage location on the archive storage system, and wherein the second configuration comprises a second correlation of video captured from the first one of the plurality of cameras to a storage location of the storage system.

3. The video system of claim 1, comprising:
    the translation unit configured to process the archive video in the first configuration to determine a scene associated with the at least a first one of the plurality of cameras and transfer the archive video of the first one of the plurality of cameras for storage on the storage system in the second configuration in a storage location based on the scene.

4. The video system of claim 1, comprising:
    the translation unit configured to determine scenes associated with individual storage locations of the archive storage system, correlate the scenes associated with the individual storage locations of the archive storage system to scenes associated with storage locations of the storage system, transfer the archive video for storage on the storage system as the scenes associated with the storage locations of the storage system.

5. The video system of claim 4, wherein the translation unit is configured to determine a video signature for each of the scenes associated with the individual storage locations of the archive storage system to determine the scenes associated with the individual storage locations of the archive storage system.

6. The video system of claim 4, wherein the translation unit is configured to compare frames of each of the scenes associated with the individual storage locations of the archive storage system to frames of each of the scenes associated with the storage locations of the storage system to determine the scenes associated with the individual storage locations of the archive storage system.

7. A method of operating a video system, the method comprising:
    receiving video captured from a plurality of cameras wherein the video was captured in a respective configuration format;
    storing the video captured by the plurality of cameras in a storage system in the same respective configuration format;
    receiving archive video stored in a first configuration on an archive storage system, wherein the archive storage system is separate from the storage system, wherein the archive video comprises video previously captured from at least a first one of the plurality of cameras and captured in the first configuration format, identifying video captured from at least a second one of the plurality of cameras in a second configuration format and stored in the storage system in the second configuration format;

translating the configuration of the archive video from the first configuration to the second configuration; and transferring the translated archive video to the storage system in the second configuration.

8. The method of claim 7, wherein the first configuration comprises a first correlation of the video previously captured from the first one of the plurality of cameras to a first storage location on the archive storage system, and wherein the second configuration comprises a second correlation of video captured from the first one of the plurality of cameras to a storage location of the storage system.

9. The method of claim 7, further comprising:
processing the archive video in the first configuration to determine a scene associated with the at least a first one of the plurality of cameras and transferring the archive video of the first one of the plurality of cameras for storage on the storage system in the second configuration in a storage location based on the scene.

10. The method of claim 7, further comprising:
determining scenes associated with individual storage locations of the archive storage system, correlating the scenes associated with the individual storage locations of the archive storage system to scenes associated with storage locations of the storage system, transferring the archive video for storage on the storage system as the scenes associated with the storage locations of the storage system.

11. The method of claim 10, wherein determining the scenes associated with the individual storage locations of the archive storage system comprises determining a video signature for each of the scenes associated with the individual storage locations of the archive storage system.

12. The method of claim 10, wherein determining the scenes associated with the individual storage locations of the archive storage system comprises comparing frames of each of the scenes associated with the individual storage locations of the archive storage system to frames of each of the scenes associated with the storage locations of the storage system.

13. A non-transitory computer-readable medium having program instructions stored thereon for operating a video system, that when executed by the video system, direct the video system to:

receive video captured from a plurality of cameras;

store the received video, wherein the video captured from each of the plurality of cameras is in a respective configuration format and stored in the storage system in the same respective configuration;

receive archive video stored in a first configuration format on an archive storage system, wherein the archive video comprises video previously captured from at least a first one of the plurality of cameras and captured in a first configuration format;

identify video captured from at least a second one of the plurality of cameras in a second configuration formation and stored by the storage system in the second confirmation format;

translate the configuration of the archive video from the first configuration to the second configuration, and transfer the translated archive video to the storage system.

14. The non-transitory computer-readable medium of claim 13, wherein the first configuration comprises a first correlation of the video previously captured from the first one of the plurality of cameras to a storage location on the archive storage system, and wherein the second configuration comprises a second correlation of video captured from the first one of the plurality of cameras to a storage location of the storage system.

15. The non-transitory computer-readable medium of claim 13, wherein the instructions further direct the video system to process the archive video in the first configuration to determine a scene associated with the at least a first one of the plurality of cameras and transfer the archive video of the first one of the plurality of cameras for storage on the storage system in the second configuration in a storage location based on the scene.

16. The non-transitory computer-readable medium of claim 13, wherein the instructions further direct the video system to determine scenes associated with individual storage locations of the archive storage system, correlate the scenes associated with the individual storage locations of the archive storage system to scenes associated with storage locations of the storage system, and transfer the archive video for storage on the storage system as the scenes associated with the storage locations of the storage system.

17. The non-transitory computer-readable medium of claim 16, wherein the instructions direct the video system to determine a video signature for each of the scenes associated with the individual storage locations of the archive storage system to determine the scenes associated with the individual storage locations of the archive storage system.

18. The non-transitory computer-readable medium of claim 16, wherein the instructions direct the video system to compare frames of each of the scenes associated with the individual storage locations of the archive storage system to frames of each of the scenes associated with the storage locations of the storage system to determine the scenes associated with the individual storage locations of the archive storage system.

* * * * *